(No Model.)

2 Sheets—Sheet 1.

C. V. ARBOGAST.
GLASS PRESS.

No. 547,705.

Patented Oct. 8, 1895.

Witnesses:
J. B. McGirr.
W. Darrell.

Inventor:
Charles V. Arbogast
by Connolly Bros.
Attys (No Model.) 2 Sheets—Sheet 2.
C. V. ARBOGAST.
GLASS PRESS.
No. 547,705. Patented Oct. 8, 1895.
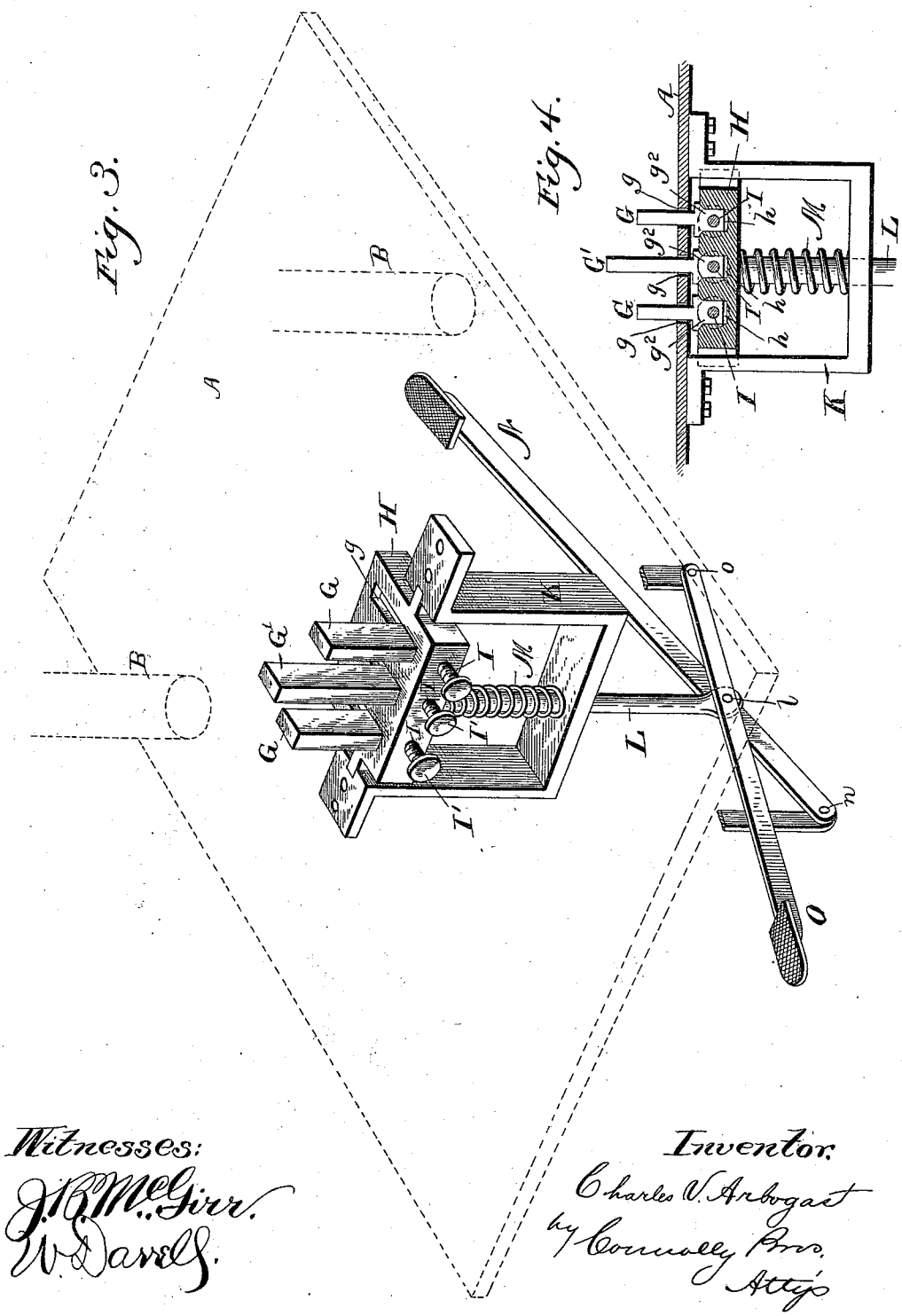

UNITED STATES PATENT OFFICE.

CHARLES V. ARBOGAST, OF PITTSBURG, PENNSYLVANIA.

GLASS-PRESS.

SPECIFICATION forming part of Letters Patent No. 547,705, dated October 8, 1895.

Application filed May 15, 1895. Serial No. 549,417. (No model.)

*To all whom it may concern:*

Be it known that I, CHARLES V. ARBOGAST, a citizen of the United States, residing at Pittsburg, in the county of Allegheny and State of Pennsylvania, have invented certain new and useful Improvements in Glass-Presses; and I do hereby declare the following to be a full, clear, and exact description of the invention, such as will enable others skilled in the art to which it appertains to make and use the same.

My invention has relation to glass-presses, and has for its object the provision of a novel guide or stop for the mold. Heretofore in glass-presses the mold has been guided to or stopped at the proper position for pressing by a screw fitting in a block and acting as a guide or stop and located on the rear end of the press-plate, the operation being to push the mold under the plunger until it comes in contact with the stop or stops, and after the plunger has descended to remove the mold from under the same by drawing it toward the operator. This arrangement necessitated the entire handling of the mold at the front of the press-table, keeping the mold constantly in front of the presser and requiring him to do the work of opening the mold and removing the articles.

In carrying my invention into effect I provide movable guides or stops which are so constructed and arranged that they may be removed from the rear of the mold and the latter pushed over the spot previously accupied by such stops and to the rear of the press-plate, where it can be opened and manipulated by the turning-out boy.

My invention consists in the novel construction, combination, and arrangements of parts, as hereinafter described.

Figure 1:
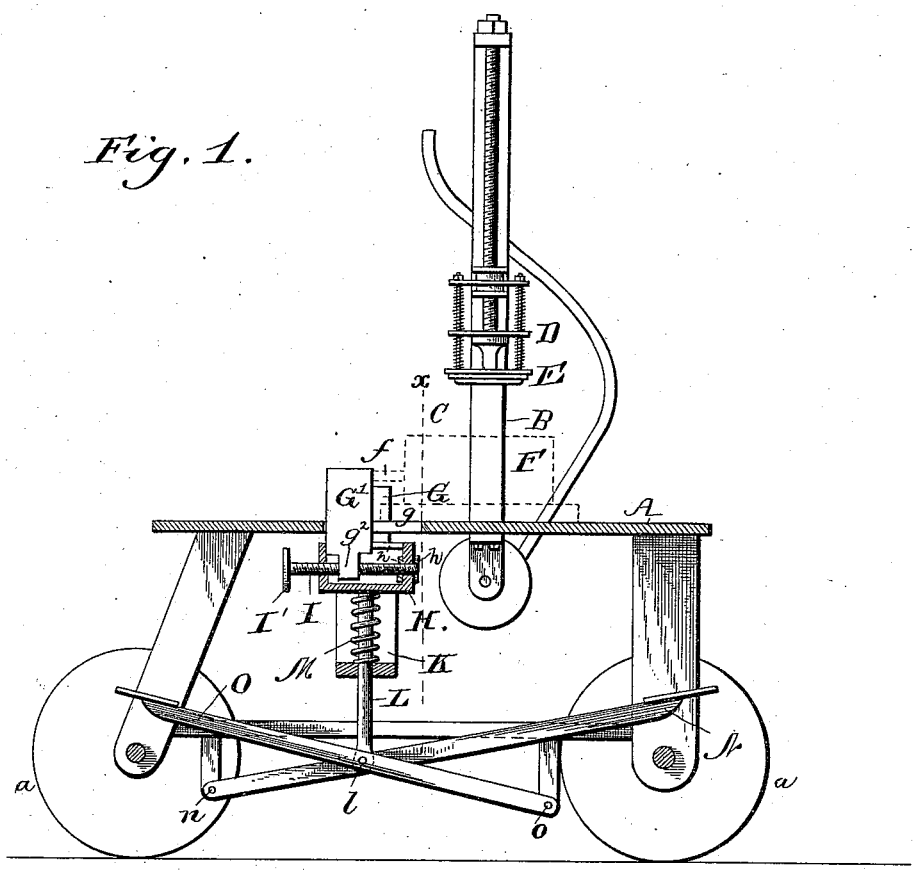
Figure 2:
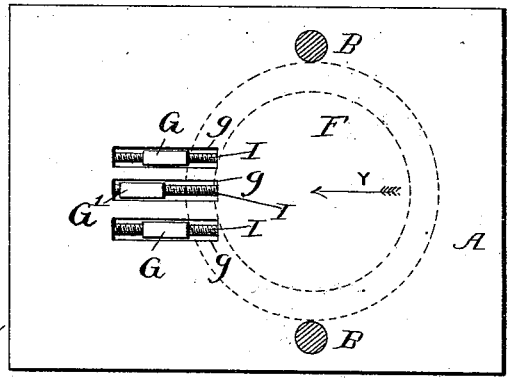

Referring to the accompanying drawings, Figure 1 is a vertical longitudinal sectional view of a glass-press constructed according to my invention. Fig. 2 is a horizontal sectional view of the same. Fig. 3 is a perspective view of the movable guides or stops and their actuating mechanism. Fig. 4 is a vertical transverse sectional view on the line $x\,x$, Fig. 1.

A designates the press-table, supported on wheels $a\,a$ and carrying the standards B B, which support and guide the plunger and its appurtenant parts.

C designates the plunger carried by the cross-head D, and having the spring-plate or follower E, which is constructed and arranged in the ordinary manner.

F designates the mold. (Shown in dotted lines in Fig. 1 beneath the plunger and in position against the movable guides or stops.) Upon the rear of the mold is a guiding or centering pin $f$, the purpose of which is to center the mold when a mold having a square or other cavity is employed.

G G' G designate the movable guides or stops, which pass through slots $g\,g'\,g$ in the press-plate A and serve to stop the mold at the proper position beneath the plunger and maintain it in such position during the pressing operation. The central guide or stop G' projects slightly above the two other guides G G, in order that when a mold having a square cavity is used the centering-pin $f$ on the rear of the mold may be swung around over the top of either of the guides or stops G G and brought into contact with the stop G', as shown in Figs. 1 and 2 of the drawings. The guides or stops G G' G are all carried by a head-block H and are adjustable longitudinally in slots $h\,h\,h$ in said block, the stops being formed with nuts $g^2\,g^2\,g^2$ on their lower ends, which slide in the slots $h\,h\,h$ in the head H and engage with screws I I I, which pass through the nuts $g^2\,g^2\,g^2$, serving to adjust the guides or stops to any desired position, the screws having hand-wheels I' I' I' on their outer ends, by which they may be turned to adjust the stops, the screws turning loosely in the block H and being secured against endwise movement by a collar $h$ on the end of the screw outside of the block and a collar $h'$ on the inside of the block. The head-block H is carried in and guided by a hanger K, which is secured to the bottom of the press-plate and is carried upon the upper end of the vertically-movable rod L. A spring M surrounds the rod L between the head-block H and the hanger and serves to press the head-block upwardly, so as to project the guides or stops G G' G through the slots in the press-plate. To the lower end of the rod L are attached two treadles N and O, the treadle N being pivoted at $n$ to the supporting-frame of the press-plate, and the treadle O being similarly pivoted at $o$ to the frame of the press-plate. The treadle N projects forward toward the front press-plate, while the treadle O projects toward the rear of the same, and as both treadles are pivotally secured at $l$ to the rod L either the presser or the turning-out boy can depress the guides or stops G G' G below the level of the press-plate by depressing one of the treadles N or O.

The operation of my improved press is as follows: The presser, standing at the end of the table farthest from the guides or stops, pushes the mold in the direction of the arrow Y until it comes in contact with the guides or stops G G' G, and at the beginning of the operation with any particular mold these guides or stops are separately adjusted lengthwise of the press-plate by turning the hand-wheels I' I' I'. When the mold has been brought in contact with the guides or stops, the plunger is caused to descend and the glass is pressed. The plunger being elevated the presser or the turning-out boy depressing either of the treadles N or O draws down the rod L, thus causing the guides or stops G G' G to descend until their upper ends are below the surface of the press plate. The mold is then drawn over the space previously occupied by the guides or stops and opened by the turning-out boy. The glass is removed and the mold is then returned to its former position at the front of the press-plate. The presser now releases the pressure on treadle N and the guides or stops G G' G resume their former position, being forced upwardly by the spring M, when the press is again ready for operation.

The advantages of my invention are that the labor of the presser is greatly reduced, and as his attention is solely directed to the pressing operation and he is relieved of the labor of opening the mold or turning-out boy he is enabled to devote his energies and attention more particularly to that part of the operation requiring the greatest amount of skill—i. e., the cutting off of the glass, the adjusting of the mold, and the pressing.

Having described my invention, I claim—

1. In a glass press, the combination with the press plate, and pressing mechanism of movable guides or stops, and means for positively moving said guides or stops into or out of the path of movement of the mold, substantially as described.

2. In a glass press, the combination with a slotted press plate, of a movable mold, a horizontally adjustable guide or stop passing through the slotted plate, and means for positively raising and lowering said guide or stop, substantially as described.

3. In a glass press, the combination with the slotted press plate A, of the movable vertical guides or stops G, G', G, the rod L depending therefrom, hanger K, and spiral spring M, all constructed and arranged substantially as described.

In testimony whereof I have affixed my signature in presence of two witnesses.

CHARLES V. ARBOGAST.

Witnesses:
P. J. LAVELLE,
CHAS. W. CAMPBELL.